US008326941B2

(12) United States Patent
Aviles Sanchez et al.

(10) Patent No.: US 8,326,941 B2
(45) Date of Patent: Dec. 4, 2012

(54) METHOD FOR AUTONOMIC DETECTION AND REPAIR OF BROKEN LINKS IN WEB ENVIRONMENTS

(75) Inventors: Juan A. Aviles Sanchez, Madrid (ES); Manuel Rodriguez Rodriguez, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 11/967,706

(22) Filed: Dec. 31, 2007

(65) Prior Publication Data
US 2009/0172154 A1    Jul. 2, 2009

(51) Int. Cl.
*G06F 15/16* (2006.01)
(52) U.S. Cl. .................................. 709/217; 709/203
(58) Field of Classification Search .................. 709/202, 709/203, 217, 219, 223, 224, 227, 228
See application file for complete search history.

(56) References Cited

U.S. PATENT DOCUMENTS

| 6,253,204 | B1 * | 6/2001 | Glass et al. ................... 707/102 |
| 6,321,242 | B1 * | 11/2001 | Fogg et al. ..................... 715/236 |
| 6,578,078 | B1 * | 6/2003 | Smith et al. .................... 709/224 |
| 6,606,653 | B1 * | 8/2003 | Ackermann et al. .......... 709/219 |
| 7,392,303 | B2 * | 6/2008 | Smith et al. .................... 709/223 |
| 7,401,287 | B2 * | 7/2008 | Suzuki ........................ 715/208 |
| 2003/0158953 | A1 * | 8/2003 | Lal ............................... 709/230 |

* cited by examiner

*Primary Examiner* — Greg C Bengzon
(74) *Attorney, Agent, or Firm* — Cantor Colburn LLP; Joseph Polimeni

(57) ABSTRACT

A method for implementing autonomic detection and repair of broken links in Web environments includes receiving a request for additional Web content in a server in response to a link present in an originating Web content held on a host server; determining the present state of the received link; wherein the server performs in response to the received link: returns the requested additional Web content to a user; returns a Web content not found notification to a user; returns a Web content has moved notification with a valid link; wherein the notifications are digitally signed by the server; wherein in response to the returned notifications, the user's browser sends the notifications to the host server; and wherein in response to the reception of the notifications the host server notifies a content manager of the link state, stores the notification in a database, and repairs the link.

3 Claims, 2 Drawing Sheets

METHOD FOR AUTONOMIC DETECTION AND REPAIR OF BROKEN LINKS IN WEB ENVIRONMENTS

BACKGROUND OF THE INVENTION

1. Field of the Invention

The present invention relates generally to computing networks, and more particularly, to a method for autonomic detection and repair of broken links in Web environments.

2. Description of the Related Art

The widespread introduction of the Internet or Web has made vast amounts of information available to people all over the world. The amount of information available over the Internet continues to grow at near exponential rates. Information on the Internet is presented to users as page views. The Internet pages are linked among each other from one site to another site to create a network. The network may be formed in a stationary manner, where the links are hard coded into the Web page, or the Web pages may be linked dynamically using several technologies, including general purpose scripting languages like PHP and Java.

SUMMARY OF THE INVENTION

A method for implementing autonomic detection and repair of broken links in Web environments, the method includes: receiving a request for additional Web content in a server in response to a link present in an originating Web content held on a host server; determining the present state of the received link; wherein the server performs at least one of the following in response to the received link: returning the requested additional Web content to a user; returning a Web content not found notification to a user; returning a Web content has moved notification with a valid link to a user; wherein the Web content not found notification and the Web content has moved notification are digitally signed by the server; wherein in response to the returned Web content not found or Web moved notifications, the user's browser sends the notifications to the host server; and wherein in response to the reception of the notifications the host server performs one or more of the following: notifies a content manager of the present state of the link, stores the notification in a database, and repairs the link.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method for autonomic detection and repair of broken links in Web environments.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
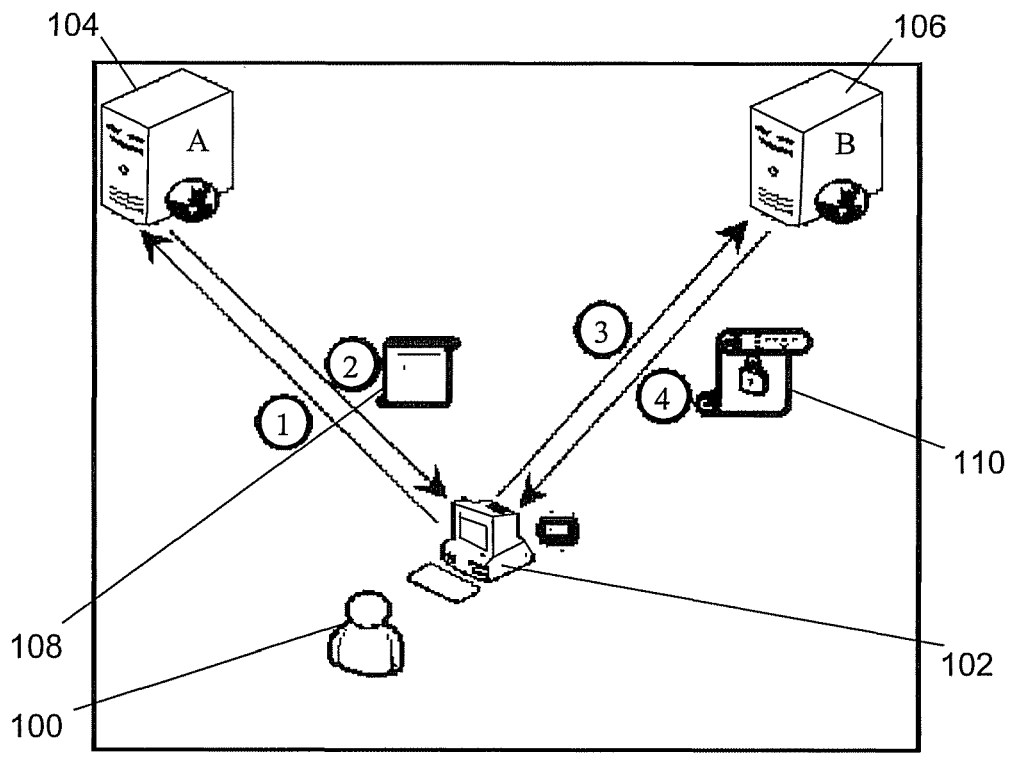
FIGS. 1A and 1B are functional diagrams of an exemplary process for detecting and repairing broken Web links in an autonomic manner according to embodiments of the invention.

The detailed description explains the preferred embodiments of the invention, together with advantages and features, by way of example with reference to the drawings.

DETAILED DESCRIPTION

Internet Web sites (and therefore, Web pages) commonly undergo a life cycle. The Web site is created at some point in time, may undergo modifications and updates, and may be moved or even removed from service. A Web site's life cycle poses a potential problem to Internet users. Issues arise when a Web page refers (linked) to another Web page that has been moved or removed. In these instances, the parent Web page contains a link that is broken; that is, the parent Web page points to a non-valid Web page address. A non-valid Web page address raises several concerns including: a poor Internet user experience, a user perception of lack of quality in the originating parent Web page, and a resultant loss of user confidence in the Web site that leads to a reduction of user page accesses and a corresponding revenue deduction.

Currently available product solutions for detecting broken links in Web pages include products that check Web pages for broken links under a set schedule. The current products take Web pages and follow static links, and if the static links are broken, the broken links are shown or reported to the administrator of the parent Web page. However, the current product solutions have certain drawbacks associated therewith. First, dynamically created links cannot be checked using current available solutions. In addition, while existing solutions may report broken links, only a notification itself is issued to the Web site administrator, and no corrective measures are taken to repair or remove the broken link.

Embodiments of the invention provide an automatic method and system that is configured for Web servers to auto fix their broken links based on trusted relationships when possible. The method and system of embodiments of the invention goes beyond traditional autonomic computing, and aims at the information residing on server systems more than server systems themselves. Embodiments of the invention provide an automatic health solution for Web servers.

Embodiments of the invention provide a means for detecting broken Web links, while also attempting to correct the broken link in an autonomic manner. In embodiments of the invention, originating Web sites may take action based on the broken link notifications, which may be authoritative responses from the referred Web site. When a user downloads a Web page from a Web site, and follows a link to another Web page that returns an error (e.g., page not found, page moved, etc.), there is a plugin at the browser level that notifies the first (referring) Web site (the one with the link) of the broken link error. The error notification sent by the referred Web site is digitally signed for the referring Web site to ensure this notification has been not modified, and is coming directly from the referred Web site through the user's browser. When the error notification is received, the first Web site (the referring one) may automatically change or remove the link, or send an alert to the administrator of the referring Web site.

Embodiments of the invention may work on both static and dynamic links, and a moved (changed) or removed link (or site) may be automatically fixed, unlike existing solutions that only work with static links and only provide notification of broken links. In embodiments of the invention, automatic actions are carried out based on a trust relationship between Web servers (based on the servers digital signature), so that administrative tasks are reduced and enhanced.

Embodiments of the invention utilize the following system components to detect and automatically attempt to fix broken links for referenced Web sites. A notification agent running as a browser plugin is in charge of identifying errors originating from referenced Web sites, correlating the errors with links, and notifying the original Web site about the existing errors. An authoritative errors report subsystem resides on a Web site and is in charge of creating authoritative notifications about not found or moved Web pages. An error collection subsystem component resides on a Web site and is responsible for collecting errors reported from third parties and to take action in response to the reports.

Figure 1B:
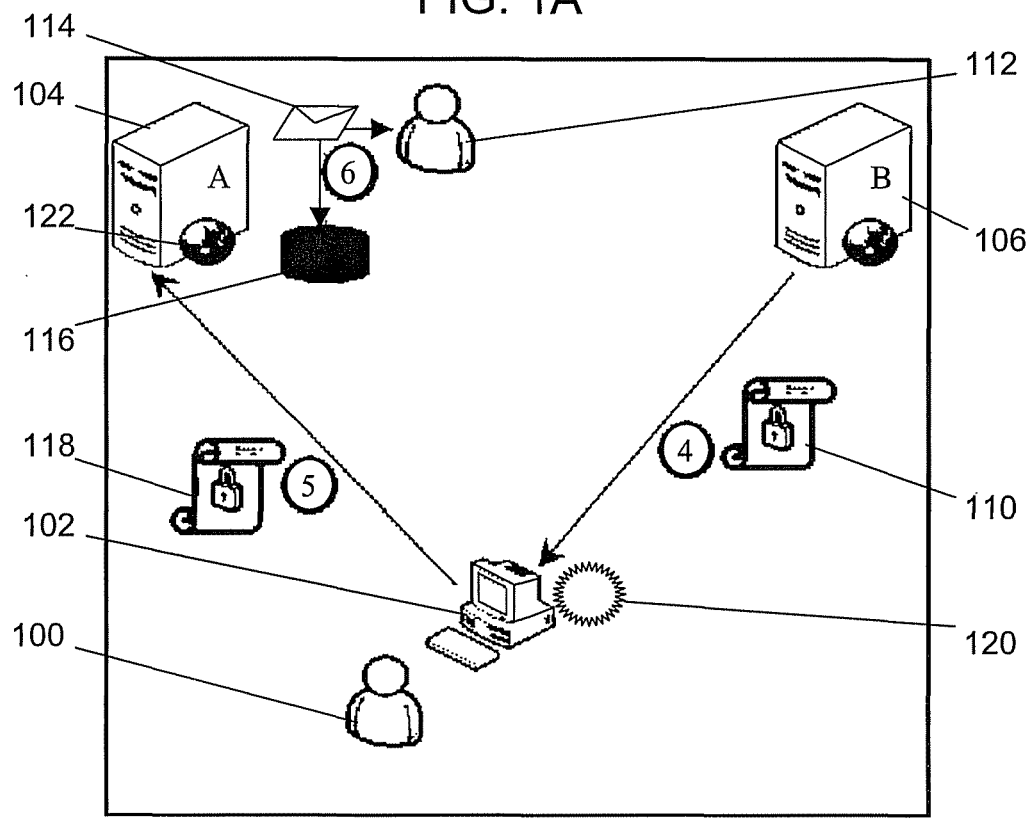

FIGS. 1A and 1B are functional diagrams of an exemplary process for detecting and repairing broken Web links in an autonomic manner according to embodiments of the invention. In FIG. 1A a user 100 requests (arrow 1) a Web page with a computing device 102 from a server A 104. In response to the user's 100 request, the host server A 104 sends a Web page 108 (arrow 2) to the computing device 102. The user 100 subsequently clicks on a link within the Web page 108, which generates a page request (arrow 3) to server B 106. The result of the page request to server B 106 may have the following outcomes: the desired page 110 is found and returned (arrow 4) to computing device 102 and no further action is taken; the desired page has not been found in the server B 106, in which case the Server B returns a page not found notification 110 that is digitally signed by itself as the desired page is hosted on the server B 106, and server B 106 is considered the trusted server for generating an answer; the desired page has been moved, and as in the previous case, server B 106 sends a notification 110 of that movement and the new link of the page, which may or may not be on the same site, and as mentioned before, this is also a trusted answer; or finally server B 106 itself is not found, in which case message 110 does not exist, and there is a browser timeout on the user's 100 computing device 102.

Referring to FIG. 1B, in case of an error (broken linl), a notification agent 120, residing on the user's 100 browser on the computing device 102, sends (arrow 5) a notification 118 to server A 104, and depending on the error the following occurs: in the case of a page not found or page has been moved, the notification error 110 sent (arrow 4) by server B 106, is sent without modification to server A 104, in order to guarantee accountability; in the case where the user's 100 browser detects that server B 106 is not responding, a notification agent 120 sends (arrow 5) a notification message 118 to server A 104, which is not digitally signed, and may be done without user interaction.

Continuing with FIG. 1B, when server A 104 receives an error notification message 110 from user's 100 notification agent 120, the error collection subsystem Web site 122 decides what to do with that error. The error collection subsystem Web site may perform one or more of the following: send a notification 114 of errors to a content manager 112; store the errors in a database 116 for further study; and fix the broken links based on digitally signed errors only.

Figure 2:
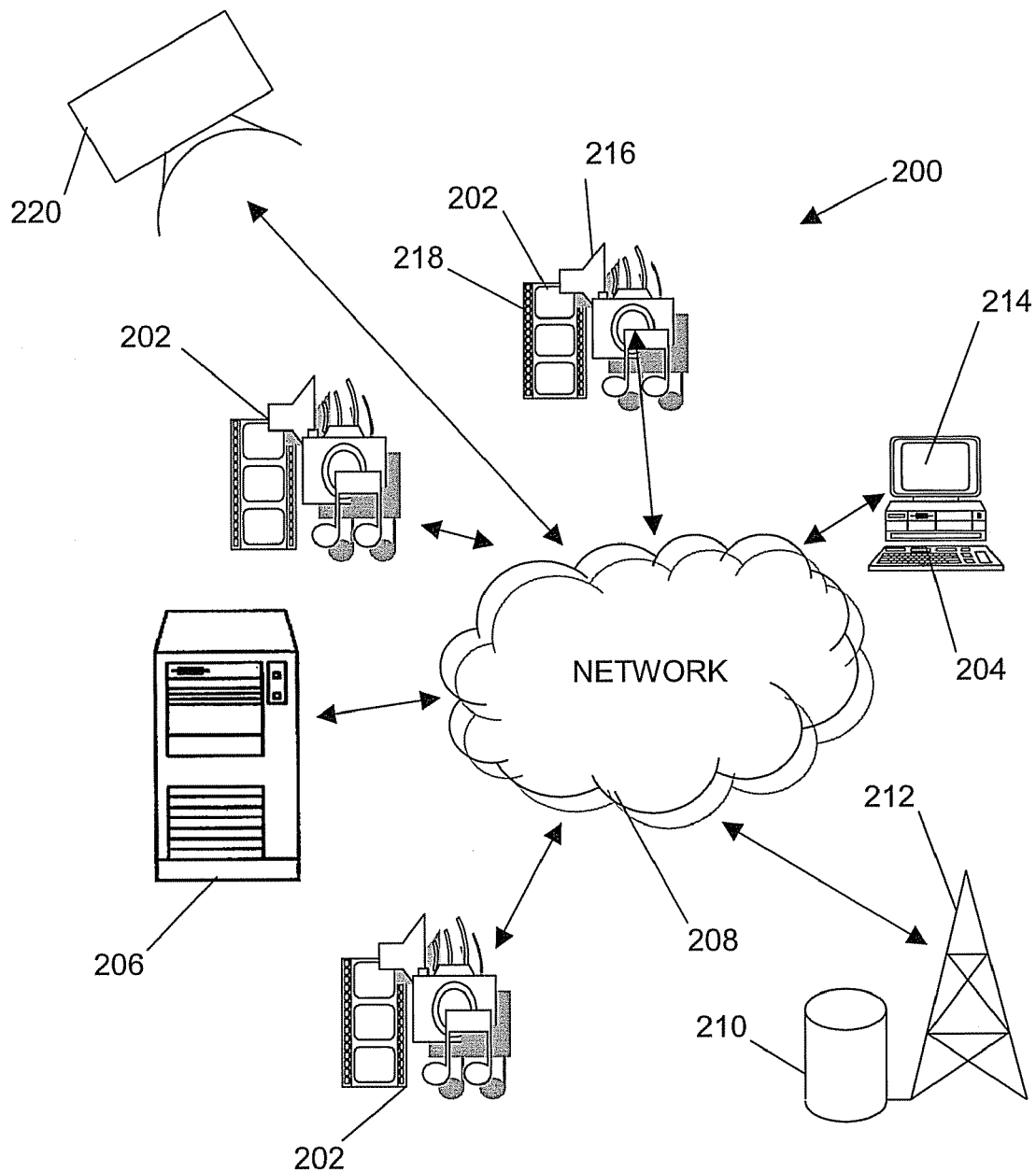
FIG. 2 illustrates an exemplary system for detecting and repairing broken Web links in an autonomic manner according to embodiments of the invention.

FIG. 2 illustrates an exemplary system 200 for detecting and repairing broken Web links in an autonomic manner according to embodiments of the invention. The system 200 includes remote devices in the form of multimedia devices 202, and desktop computer devices 204 configured with display capabilities 214 for implementing graphical user interface (GUI) aspects of the invention described herein. The multimedia devices 202 may be mobile communication and entertainment devices, such as cellular phones and mobile computing devices that are wirelessly connected to a network 208. The multimedia devices 202 have video displays 218 and audio outputs 216 for implanting the GUI described herein. The network 208 may be any type of known network including a fixed wire line network, cable and fiber optics, over the air broadcasts, satellite 220, local area network (LAN), wide area network (WAN), global network (e.g., Internet), intranet, etc. with data/Internet capabilities as represented by server 206. Communication aspects of the network are represented by cellular base station 212 and antenna 210.

Software for carrying out features of embodiments of the invention may be resident on the individual multimedia devices 202 and desktop computers 204, or stored within the server 206 or cellular base station 210.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing autonomic detection and repair of broken links in web environments, the method comprising:

receiving a request for additional web content at a first server, the request being formed at a user's computing device in response to a link present in an originating web content location held on a host server;

determining at the first server that the received link is inactive;

after determining, returning a web content has moved notification that includes a valid link that replaces the link to the user at the user's computer device, the user's computer device being separate from the server and the host server;

wherein the web content has moved notification is digitally signed by the first server;

wherein in response to the returned web content has moved notification received from the first server, the user's browser at the user's computer device sends the web content has moved notification to the host server; and wherein in response to the reception of the web content moved notification at the host server, the host server repairs the link and automatic actions for the repair of broken dynamic links are carried out in response to a trust relationship between the host server and the first server based on the server's digital signature.

2. The method of claim 1, wherein a notification agent running as a plugin on the user's browser identifies one or more errors from the server; and wherein the notification agent correlates the errors with the links, and notifies the hosting server.

3. The method of claim 1, wherein the broken links are at least one of static and dynamic links.

* * * * *